United States Patent
Yamashita (10) Patent No.: US 8,970,898 B2
(45) Date of Patent: Mar. 3, 2015

(54) IMAGE PROCESSING METHOD, ELECTRONIC APPARATUS, AND IMAGE FORMING APPARATUS

(71) Applicant: KYOCERA Document Solutions Inc., Osaka-shi, Osaka (JP)

(72) Inventor: Syuji Yamashita, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/024,575

(22) Filed: Sep. 11, 2013

(65) Prior Publication Data
US 2014/0092398 A1    Apr. 3, 2014

(30) Foreign Application Priority Data
Sep. 28, 2012  (JP) ................. 2012-216207

(51) Int. Cl.
G06K 15/00    (2006.01)
G06F 3/12     (2006.01)
G06K 15/02    (2006.01)
H04N 1/00     (2006.01)
G06T 11/60    (2006.01)
H04N 1/387    (2006.01)
G06K 9/00     (2006.01)

(52) U.S. Cl.
CPC ............ *H04N 1/00968* (2013.01); *G06T 11/60* (2013.01); *H04N 1/387* (2013.01); *G06K 9/00469* (2013.01)
USPC .......... 358/1.2; 358/1.18; 358/1.13; 358/1.14

(58) Field of Classification Search
USPC ........ 358/1.2, 1.18, 1.13, 1.14, 1.15, 1.4, 1.9, 358/1.6; 345/418, 625, 629, 634, 643, 650, 345/655, 662, 672, 570, 4; 382/173, 181, 382/113, 115, 140, 176, 151, 175, 189, 198, 382/201, 214, 257, 291, 295
See application file for complete search history.

(56) References Cited

U.S. PATENT DOCUMENTS

| | | | |
|---|---|---|---|
| 2004/0146198 A1* | 7/2004 | Herley | 382/173 |
| 2005/0179925 A1* | 8/2005 | Asami | 358/1.13 |
| 2011/0075219 A1 | 3/2011 | Sakurai | |
| 2012/0127501 A1* | 5/2012 | Kobayashi | 358/1.13 |

FOREIGN PATENT DOCUMENTS

JP    2011068060 A    4/2011

* cited by examiner

*Primary Examiner* — Ngon Nguyen
(74) *Attorney, Agent, or Firm* — Alleman Hall McCoy Russell & Tuttle LLP (57) ABSTRACT

An image processing method includes an extraction step, a specifying step, and a data generating step. The extraction step extracts the positions of one or a plurality of objects and the position of a reference character indicating reference to each object, included in image data. Based on the extraction result of the extraction step, the specifying step specifies, among the objects, a specific object for which the corresponding reference character is to be printed on a side opposite to the object printed side when the image data is printed by both-side printing. The data generating step, based on the image data, generates edited image data in which the specific object is copied to a position that allows the specific object to be printed on a paper sheet different from that for the reference character corresponding to the specific object when the both-side printing is performed.

15 Claims, 6 Drawing Sheets

| FRONT SIDE OF FIRST SHEET | BACK SIDE OF FIRST SHEET | FRONT SIDE OF SECOND SHEET | BACK SIDE OF SECOND SHEET |
|---|---|---|---|
| ·········· ·········· ·········· ·········· ·········· (see Figure a)☆··· | [P1] Figure a ·········· ·········· ·········· ·········· | [P2] Figure b ·········· ······(see Figure b)··· ······(see Figure c)☆··· | [P3] Figure c ·········· ·········· ······(see Figure d)····· |

| FRONT SIDE OF THIRD SHEET | BACK SIDE OF THIRD SHEET | FRONT SIDE OF FOURTH SHEET | BACK SIDE OF FOURTH SHEET |
|---|---|---|---|
| [P4] Figure d   [P5] Figure e | ·········· ·········· ·········· ·········· (see Figure a and Figure e)☆······ | [P1] Figure a   [P5] Figure e | [P3] Figure c |

⎫
⎬ EDITED IMAGE DATA
⎭

IMAGE PROCESSING METHOD, ELECTRONIC APPARATUS, AND IMAGE FORMING APPARATUS

INCORPORATION BY REFERENCE

This application is based upon and claims the benefit of priority from the corresponding Japanese Patent Application No. 2012-216207 filed on Sep. 28, 2012, the entire contents of which are incorporated herein by reference.

BACKGROUND

The present disclosure relates to an image processing method, an electronic apparatus, and an image forming apparatus.

Image forming apparatuses such as a printer, a copy machine, a facsimile apparatus, and a multifunction peripheral execute image forming processing of forming an image on a paper sheet based on inputted image data. For example, image data includes a document and an object. A document includes a character, a numeral, a symbol, and the like. Objects include a figure, a table, a photograph, a graph, and the like. Particularly, a document includes a reference character such as "see Figure a" or "see Table a" which indicates an object to be referred to. A viewer of such a document reads the document while referring to an object as necessary in accordance with the indication of the reference characters.

It is noted that a technique is conventionally known which, in the case where an object and relevant information about the object are present across a plurality of pages, generates print data such that the object and the relevant information are included within one page.

SUMMARY

An image processing method according to one aspect of the present disclosure includes an extraction step, a specifying step, and a data generating step. The extraction step extracts the positions of one or a plurality of objects and the position of a reference character indicating reference to each object, included in image data. The specifying step specifies a specific object among the objects based on a result of the extraction by the extraction step, the specific object being an object for which the reference character corresponding to the object is to be printed on a side opposite to a side on which the object is to be printed when the image data is printed by both-side printing. The data generating step, based on the image data, generates edited image data in which the specific object is copied to a position that allows the specific object to be printed on a paper sheet different from that for the reference character corresponding to the specific object when the both-side printing is performed.

An electronic apparatus according to another aspect of the present disclosure includes an extraction portion, a specifying portion, and a data generating portion. The extraction portion extracts the positions of one or a plurality of objects and the position of a reference character indicating reference to each object, included in image data. The specifying portion specifies a specific object among the objects based on a result of the extraction by the extraction portion, the specific object being an object for which the reference character corresponding to the object is to be printed on a side opposite to a side on which the object is to be printed when the image data is printed by both-side printing. The data generating portion, based on the image data, generates edited image data in which the specific object is copied to a position that allows the specific object to be printed on a paper sheet different from that for the reference character corresponding to the specific object when the both-side printing is performed.

An image forming apparatus according to still another aspect of the present disclosure includes an extraction portion, a specifying portion, a data generating portion, and a both-side print processing portion. The extraction portion extracts the positions of one or a plurality of objects and the position of a reference character indicating reference to each object, included in image data. The specifying portion specifies a specific object among the objects based on a result of the extraction by the extraction portion, the specific object being an object for which the reference character corresponding to the object is to be printed on a side opposite to a side on which the object is to be printed when the image data is printed by both-side printing. The data generating portion, based on the image data, generates edited image data in which the specific object is copied to a position that allows the specific object to be printed on a paper sheet different from that for the reference character corresponding to the specific object when the both-side printing is performed. The both-side print processing portion forms an image on both sides of a print sheet based on the edited image data generated by the data generating portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Schematic Configuration of Multifunction Peripheral
10

First, with reference to FIGS. 1A and 1B, the schematic configuration of a multifunction peripheral 10 according to an embodiment of the present disclosure will be described. It is noted that FIG. 1A is a schematic sectional view of the multifunction peripheral 10 and FIG. 1B is a view as seen from the direction of arrows A in FIG. 1A.

The multifunction peripheral 10 is an image forming apparatus including an image reading portion 1, an ADF 2, an image forming portion 3, a sheet feed portion 4, a control portion 5, and an operation display portion 6. The operation display portion 6 is an operation display portion such as a touch panel that displays various kinds of information in accordance with a control instruction from the control portion 5 and allows input of the various kinds of information to the control portion 5. It is noted that the multifunction peripheral 10 is an example of an electronic apparatus or an image forming apparatus according to the present disclosure. For example, a printer, a facsimile apparatus, a copy machine, and the like also correspond to an electronic apparatus or an image forming apparatus according to the present disclosure.

The image reading portion 1 is an image reading portion including a contact glass 11, a reading unit 12, mirrors 13 and 14, an optical lens 15, and a CCD (Charge Coupled Device) 16. The contact glass 11 is provided on the upper surface of the image reading portion 1, and is a transparent document table on which a document sheet P is placed as an image reading target of the multifunction peripheral 10. The image reading portion 1 reads image data from the document sheet P placed on the contact glass 11, by being controlled by the control portion 5.

Figure 1A:
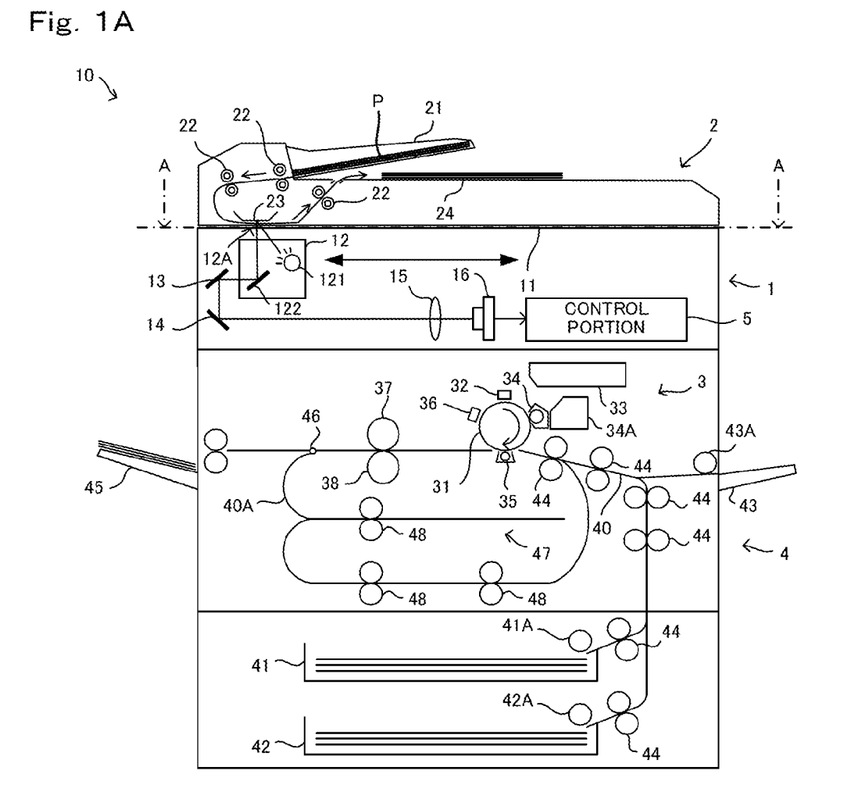
FIGS. 1A and 1B are schematic configuration diagrams of a multifunction peripheral according to an embodiment of the present disclosure.
Figure 1B:
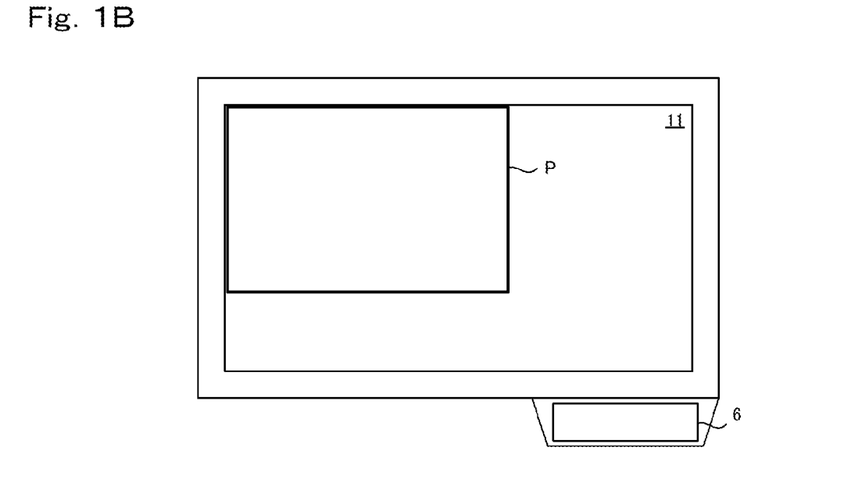

The reading unit 12 includes an LED light source 121 and a mirror 122, and can be moved in a right-left direction in FIG. 1A (secondary scanning direction) by a movement mechanism (not shown) using a drive motor such as a stepping motor. When the reading unit 12 is moved in the secondary scanning direction by the drive motor, scanning in the secondary scanning direction is performed with light radiated onto the contact glass 11 from the LED light source 121.

The LED light source 121 radiates one line of white light toward the document sheet P at a reading position 12A on the contact glass 11.

The mirror 122 reflects, toward the mirror 13, light reflected when light is radiated from the LED light source 121 to the document sheet P at the reading position 12A. The light reflected from the mirror 122 is guided to the optical lens 15 by the mirrors 13 and 14. The optical lens 15 concentrates the light entering thereto and causes the concentrated light to enter the CCD 16.

The CCD 16 is a photoelectric conversion element that converts the received light into an electric signal (voltage) corresponding to the light amount thereof and outputs the electric signal as image data. Specifically, the CCD 16 reads image data of the document sheet P, based on the light reflected from the document sheet P when light is radiated thereto from the LED light source 121. The image data read by the CCD 16 is inputted to the control portion 5.

The ADF 2 is an automatic document feeder including a document sheet set portion 21, a plurality of conveying rollers 22, a document sheet holding portion 23, and a sheet discharge portion 24. The ADF 2 is supported by a housing of the multifunction peripheral 10 so as to be openable and closable with respect to the contact glass 11.

The ADF 2 drives each of the conveying rollers 22, thereby conveying the document sheet P set on the document sheet set portion 21 through the reading position 12A on the contact glass 11 to the sheet discharge portion 24. At this time, the image reading portion 1 reads image data from the document sheet P passing through the reading position 12A.

The document sheet holding portion 23 is provided above the reading position 12A on the contact glass 11, with an interval provided therebetween so as to allow the document sheet P to pass. The document sheet holding portion 23 has a shape elongated in the primary scanning direction, and a white sheet is pasted on the lower surface (the surface on the contact glass 11 side) of the document sheet holding portion 23.

The image forming portion 3 is an image forming portion of electronic photograph type which executes image forming processing (printing processing) based on image data read by the image reading portion 1 or image data inputted from an information processing apparatus such as an external personal computer.

Specifically, the image forming portion 3 includes a photosensitive drum 31, a charging device 32, an LSU (Laser Scanner Unit) 33, a developing device 34, a transfer roller 35, an electricity removing device 36, a fixing roller 37, and a pressure roller 38. In the image forming portion 3, an image is formed on a paper sheet supplied from the sheet feed portion 4 by the following procedure.

First, the photosensitive drum 31 is uniformly charged at a predetermined potential by the charging device 32. Next, light based on image data is radiated to the surface of the photosensitive drum 31 by the LSU 33. Thus, an electrostatic latent image is formed on the surface of the photosensitive drum 31. Then, the electrostatic latent image on the photosensitive drum 31 is developed (visualized) as a toner image by the developing device 34. It is noted that a toner (developer) is supplied from a detachable toner container 34A to the developing device 34. Subsequently, the toner image formed on the photosensitive drum 31 is transferred onto a paper sheet by the transfer roller 35. Thereafter, the toner image transferred onto the paper sheet is melted and fixed by being heated by the fixing roller 37 when the paper sheet passes between the fixing roller 37 and the pressure roller 38. It is noted that the potential of the photosensitive drum 31 is removed by the electricity removing device 36.

The sheet feed portion 4 includes a paper sheet conveyance path 40, sheet feed cassettes 41 and 42, a manual feed tray 43, a plurality of conveying rollers 44, a sheet discharge tray 45, a conveyance switching portion 46, a sheet inverting mechanism 47, and a plurality of conveying rollers 48. By control from the control portion 5, the sheet feed portion 4 passes a paper sheet contained in the sheet feed cassette 41 or 42 or a paper sheet placed on the manual feed tray 43 through the image forming portion 3, and conveys the paper sheet to the sheet discharge tray 45.

The paper sheet conveyance path 40 starts from the sheet feed cassette 41 or 42 or the manual feed tray 43, passes through the image forming portion 3, and leads to the sheet discharge tray 45, and is a paper sheet conveyance path through which a paper sheet is conveyed by each conveying roller 44.

For the sheet feed cassettes 41 and 42, pickup rollers 41A and 42A are respectively provided which are driven by a drive motor (not shown) and take out a paper sheet from the sheet feed cassettes 41 and 42. In addition, for the manual feed tray 43, a pickup roller 43A is provided which is driven by a drive motor (not shown) and takes out a paper sheet from the manual feed tray 43.

The plurality of conveying rollers 44 are linked via a drive transmission portion such as a gear to a drive motor (not shown) which is drive-controlled by the control portion 5. The plurality of conveying rollers 44 are rotationally driven by the drive motor (not shown) while holding a paper sheet, thereby conveying the paper sheet on the paper sheet conveyance path 40.

The conveyance switching portion 46 switches the conveyance destination of a paper sheet on the paper sheet conveyance path 40 to either the sheet discharge tray 45 or a both-side conveyance path 40A leading to the sheet inverting mechanism 47. The both-side conveyance path 40A is a paper sheet conveyance path for conveying the paper sheet again from the conveyance switching portion 46 to the image forming portion 3 by the plurality of conveying rollers 48. It is noted that the conveyance switching portion 46 includes a drive portion and a switching nail, for example. The drive portion is a solenoid or the like which is drive-controlled by the control portion 5. The switching nail is operated by the drive portion to switch the conveyance destination of a paper sheet on the paper sheet conveyance path 40 to the sheet discharge tray 45 or the sheet inverting mechanism 47.

The sheet inverting mechanism 47 inverts a paper sheet conveyed on the both-side conveyance path 40A between the front side and the back side. Thus, in the image forming portion 3, image forming processing is performed for the back side of the paper sheet conveyed through the sheet inverting mechanism 47. Therefore, in the multifunction peripheral 10, a both-side print function of executing both-side printing to form an image on both sides of a paper sheet is realized by using the both-side conveyance path 40A and the sheet inverting mechanism 47.

<Both-Side Print Processing>

Figure 2:
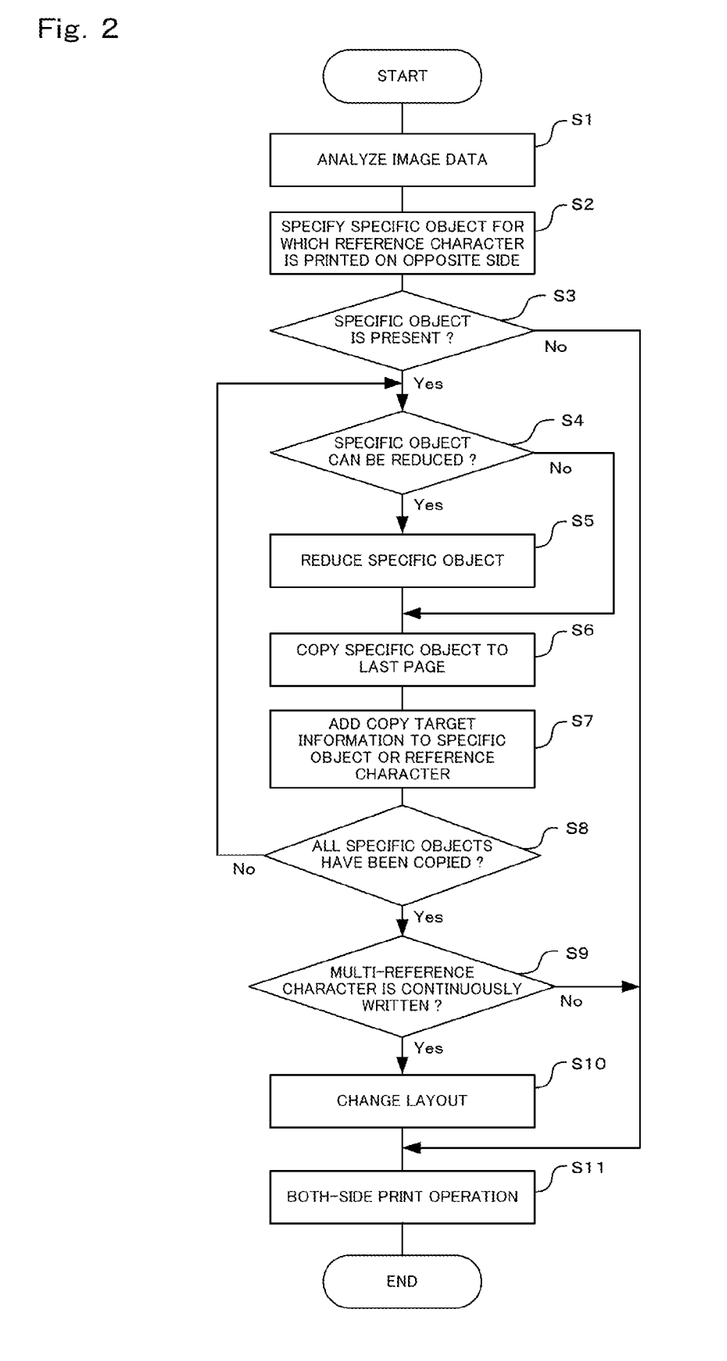
FIG. 2 is a flowchart for explaining an example of the procedure of both-side print processing executed by the multifunction peripheral according to the embodiment of the present disclosure.

Hereinafter, with reference to a flowchart shown in FIG. 2, an example of a procedure of both-side print processing executed by the control portion 5 in the multifunction peripheral 10 will be described. It is noted that the control portion 5 includes control devices such as a CPU, a RAM, a ROM, and an EEPROM. In addition, the control portion 5 may be formed by an electronic circuit.

The both-side print processing is executed by the control portion 5 when, for example, the both-side print function is set to be enabled by a user's operation on the operation display portion 6 or a user's operation on an external information processing apparatus and then a request to print image data including a plurality of pages is given. It is noted that the image data is image data read by the reading portion 1 or image data inputted from an external information processing apparatus such as a personal computer.

[Step S1]

First, in step S1, the control portion 5 analyzes image data (hereinafter, referred to as "input image data") including a plurality of pages which is inputted as a print target of both-side printing, and extracts objects and characters included in the input image data.

More specifically, the control portion 5 extracts the positions of one or a plurality of objects and the position of a reference character indicating reference to each object, included in the input image data. At this time, the control portion 5 extracts the position of an identification character attached on each object for identifying the object, as the position of the object. Here, this processing corresponds to an extraction step. In addition, the control portion 5 executing this processing corresponds to an extraction portion. It is noted that the position of an object and the position of a reference character are at least information relevant to a page number in the input image data.

The object is a figure, a table, a photograph, or a graph included in the input image data. In addition, the identification character is a character such as "Figure a", "Table a", "Photograph a", or "Graph a" written above or below, at the right or the left of, or inside the object in the input image data. Further, the reference character is a character such as "see Figure a", "see Table a", "see Photograph a", or "see Graph a" included in a character string written at a position different from the position of the identification character in the input image data. That is, the control portion 5 determines the reference character based on a word such as "see". In addition, it is also conceivable that the control portion 5 extracts, as the reference character, an identification character written in parentheses such as (Figure a) or (Table a).

It is noted that in the case where the input image data has no concept of page, the positions of objects, and the like are changed depending on the paper size used for both-side printing. Therefore, it is conceivable that the control portion 5 generates image data of a simulation result for the case where printing is performed with a paper size designated when the both-side printing has been requested, and executes each step of the both-side print processing based on the generated image data.

[Step S2]

Next, in step S2, based on a result of the extraction in step S1, the control portion 5 specifies one or a plurality of specific objects among the objects, the specific object being an object for which a reference character corresponding to the object is to be printed on a side opposite to a side on which the object is to be printed when the input image data is printed by both-side printing. That is, the control portion 5 predicts a result of both-side printing to be executed based on the input image data, and then, if the position of an identification character and the position of a reference character including the same identification character are separated on the front side and the back side of the same paper sheet, specifies an object corresponding to the identification character as the specific object. Here, this processing corresponds to a specifying step. In addition, the control portion 5 executing this processing corresponds to a specifying portion.

Specifically, among the objects, in the case where, on a side opposite to a side on which an identification character corresponding to an object is to be printed, a reference character including the same identification character is to be present, the control portion 5 specifies the object as a specific object. For example, in the case where, when the input image data is printed as it is on both sides, an identification character "Figure a" is to be printed on the front side of a paper sheet and a reference character "see Figure a" is to be printed on the back side of the paper sheet, an object of Figure a corresponding to the identification character "Figure a" is specified as the specific object.

[Step S3]

Then, in step S3, the control portion 5 determines whether or not a specific object is present. That is, in step S3, the control portion 5 determines whether or not there are an object and a reference character that are to be printed separately on the front side and the back side of one paper sheet when the input image data is printed by both-side printing.

Here, if the control portion 5 determines that a specific object is present (Yes in S3), the control portion 5 shifts the process to step S4. On the other hand, if the control portion 5 determines that a specific object is not present (No in S3), the control portion 5 shifts the process to step S11 described later, to execute both-side print operation based on the input image data.

[Step S4]

Then, in the following steps S4 to S10, the control portion 5 executes processing for copying each specific object specified in step S2 onto a page different from a page for a reference character corresponding to the specific object. Here, this processing corresponds to a data generating step. In addition, the control portion 5 executing this processing corresponds to a data generating portion.

First, in step S4, the control portion 5 determines whether or not the size of the specific object can be reduced. Specifically, if the size of a character included in the specific object is larger than a predetermined minimum size, the control portion 5 determines that the specific object can be reduced. The minimum size is a predetermined size that, when a specific object is reduced at a predetermined reduction rate, can ensure a visibility set in advance for the size of a character included in the specific object.

It is noted that the control portion 5 can execute OCR processing for the input image data, thereby specifying the size of a character included in a specific object. In addition, the determination by the control portion 5 about whether or not a specific object can be reduced may be performed in accordance with whether or not the size of the specific object is larger than a predetermined size, for example.

Further, it is also conceivable that, after reducing the specific object at the predetermined reduction rate, the control portion 5 reads a character size from the reduced specific object, and then if the character size is larger than the minimum size, determines that the specific object can be reduced. Alternatively, in another embodiment, it is also conceivable to reduce a specific object at a predetermined reduction rate irrespective of the size of a character included in the specific object, or the like.

Here, if the control portion 5 has determined that the specific object can be reduced (Yes in S4), the control portion 5 shifts the process to step S5. On the other hand, if the control portion 5 has determined that the specific object cannot be reduced (No in S4), the control portion 5 shifts the process to step S6.

[Step S5]

In step S5, the control portion 5 generates a reduced object obtained by reducing the specific object at a predetermined reduction rate. The size of a character included in the reduced object generated here is larger than the minimum size, and thus a visibility assumed in advance for the reduced object is ensured. Thus, the size of the specific object on a copy destination page for the specific object is reduced, whereby a plurality of specific objects can be placed on the same page and toner consumption upon printing can be reduced.

In addition, it is also conceivable that at this time, the control portion 5 calculates a reduction rate that causes the size of the smallest character included in a specific object to be the minimum size, and reduces the specific object at the reduction rate. Thus, since the size of a character in the specific object becomes the minimum size, a visibility assumed in advance for a character in the specific object is ensured while the size of the copied specific object can be made as small as possible.

[Step S6]

Next, in step S6, the control portion 5 generates, based on the image data, edited image data in which the specific object is copied to a position that allows the specific object to be printed on a paper sheet different from that for the reference character corresponding to the specific object upon both-side printing. Specifically, the control portion 5 generates edited image data by adding, at the end of the image data, an additional page onto which the specific object or the reduced object has been copied. Thus, in the edited image data, each specific object is copied onto a page of a paper sheet different from that for the reference character corresponding to the specific object.

It is noted that in the case where there is a blank space on the last paper sheet when the input image data is printed by both-side printing, and the last paper sheet is different from a paper sheet on which the specific object is placed, it is also conceivable as another embodiment that the specific object is copied to the blank space. Besides, the location of the additional page is not limited to the end of the input image data but may be added at the beginning of the input image data.

[Step S7]

Subsequently, in step S7, the control portion 5 adds, to the reference character corresponding to the specific object, predetermined copy target information indicating that the specific object has been copied. Specifically, the copy target information is an asterisk or the like set in advance as a sign indicating that the specific object has been copied onto the additional page. Alternatively, it is also conceivable that the copy target information is the page number of the additional page onto which the specific object has been copied.

Thus, when printing is executed based on the edited image data including the added copy target information, a viewer can easily recognize, by the copy target information, that the specific object corresponding to the reference character has been copied onto the additional page. It is noted that the copy target information may be added to one or some of the specific object, the identification character, and the reference character.

[Step S8]

Thereafter, in step S8, the control portion 5 determines whether or not copying of all the specific objects specified in step S2 has been finished.

Here, if copying of all the specific objects has been finished (Yes in S8), the control portion 5 shifts the process to step S9. On the other hand, if the copying has not been finished (No in S8), the control portion 5 returns the process to the step S4.

[Step S9]

Next, in step S9, the control portion 5 determines whether or not there is a reference character indicating reference to a plurality of the specific objects at the same time. Specifically, the control portion 5 determines whether or not "see Figure a and Figure e", "see Figures a and e", "see Figure a, Figure e", or the like is written.

Here, if the control portion 5 has determined that there is a reference character indicating reference to a plurality of the specific objects (Yes in S9), the control portion 5 shifts the process to step S10. On the other hand, if the control portion 5 has determined that there is no reference character indicating reference to a plurality of the specific objects (No in S9), the control portion 5 shifts the process to step S11. As another embodiment, it is also conceivable that the following step S10 is executed when a plurality of reference characters are included within a predetermined number (one or a plurality) of lines or when a plurality of reference characters are included in a predetermined range (block), for example.

[Step S10]

In step S10, the control portion 5 changes the layout of the specific objects on the additional pages so that the plurality of specific objects corresponding to the reference character indicating reference to the plurality of specific objects are placed on the same page in the edited image data.

It is noted that in the case where a plurality of reference characters each corresponding to a different combination of specific objects are respectively written at a plurality of positions in the input image data, it is also conceivable that the control portion 5 does not change the layout of the specific objects on the additional pages. Alternatively, it is also conceivable that the control portion 5 prioritizes a combination that appears most frequently among the plurality of combinations, to place the corresponding specific objects on the same page.

[Step S11]

Then, in step S11, the control portion 5 controls the image forming portion 3 to execute both-side print operation of forming an image on both sides of a paper sheet based on the input image data or the edited image data. Here, the control portion 5 executing this processing corresponds to a both-side print processing portion.

Here, in the case where the both-side print operation is performed based on the edited image data, a document obtained as a result of the printing includes the additional page newly added at the end of the input image data, in which copies of the specific objects are printed on the additional page. Therefore, a viewer of the document in which the edited image data is printed on both sides can refer to the specific objects printed on a different paper sheet without turning back a paper sheet to refer to the specific objects. Thus, a burden on the viewer can be reduced. In addition, since the new additional page is added at the end of the input image data, the original document layout of the input image data is maintained.

Hereinafter, with reference to FIGS. 3 to 6, examples of a result of execution of the both-side print processing will be described.

Figure 3:
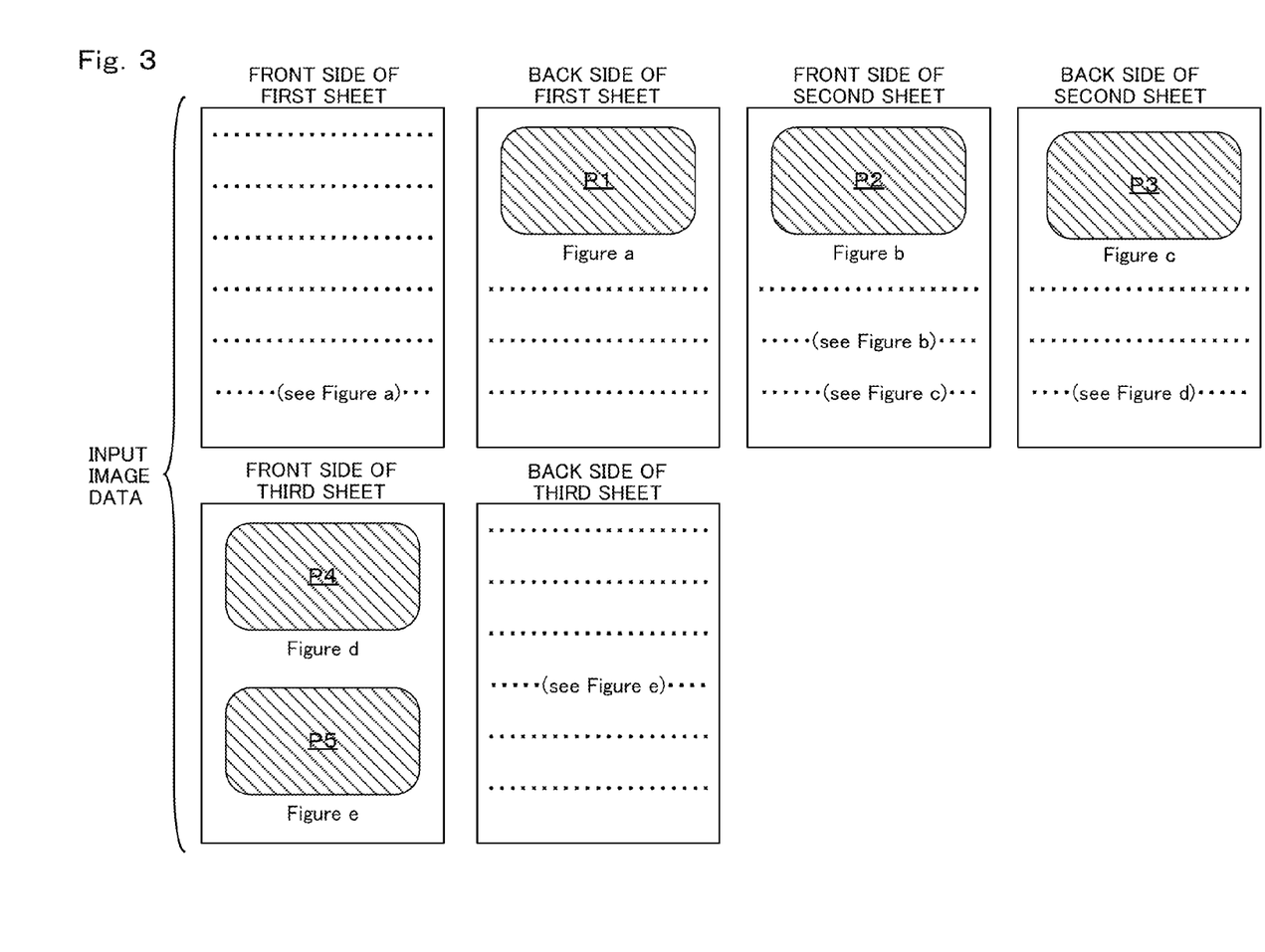
FIG. 3 is a diagram for explaining an example of input image data inputted to the multifunction peripheral according to the embodiment of the present disclosure.
Figure 4:
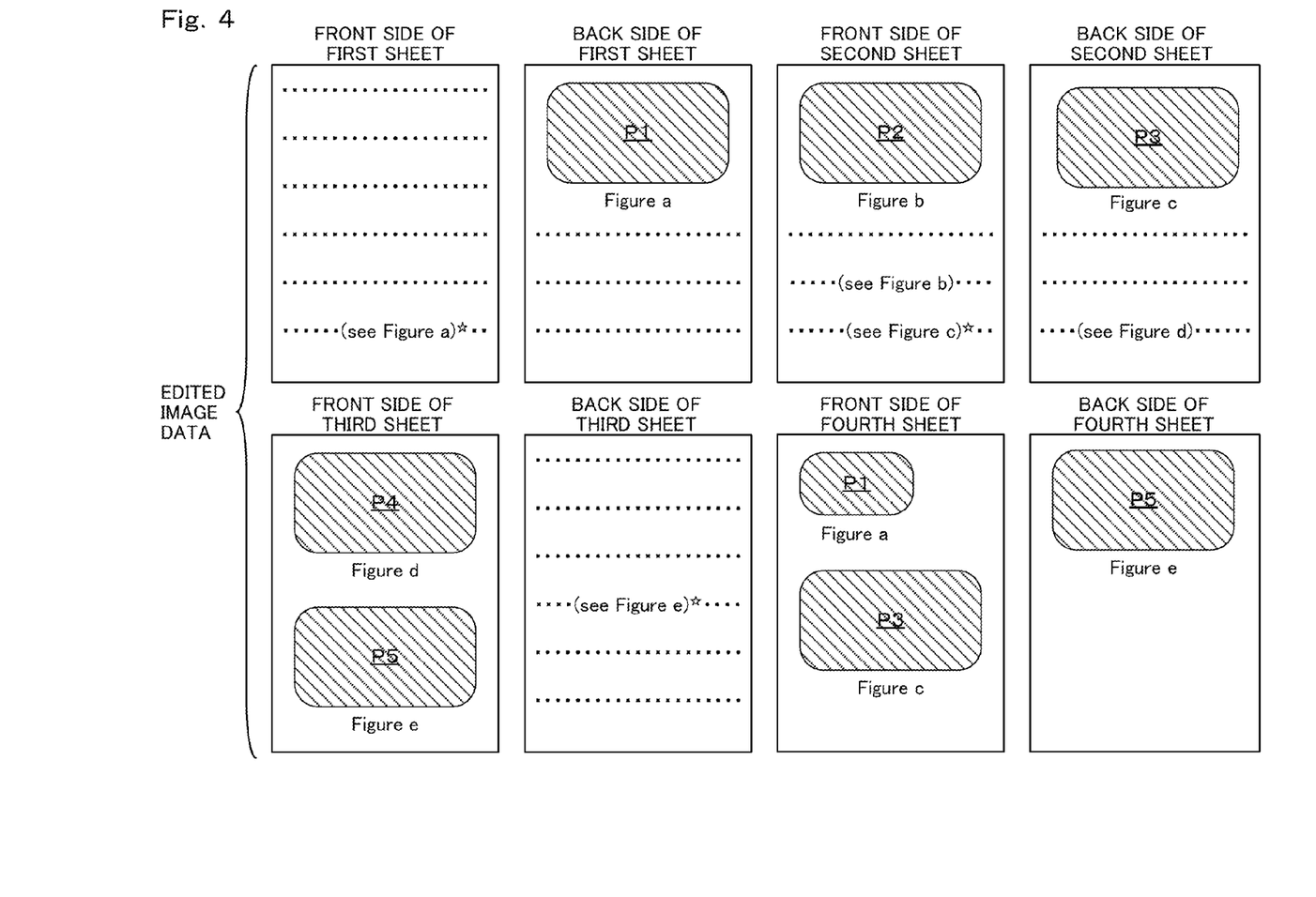
FIG. 4 is a diagram for explaining an example of a result of execution of the both-side print processing executed by the multifunction peripheral according to the embodiment of the present disclosure.
Figure 5:
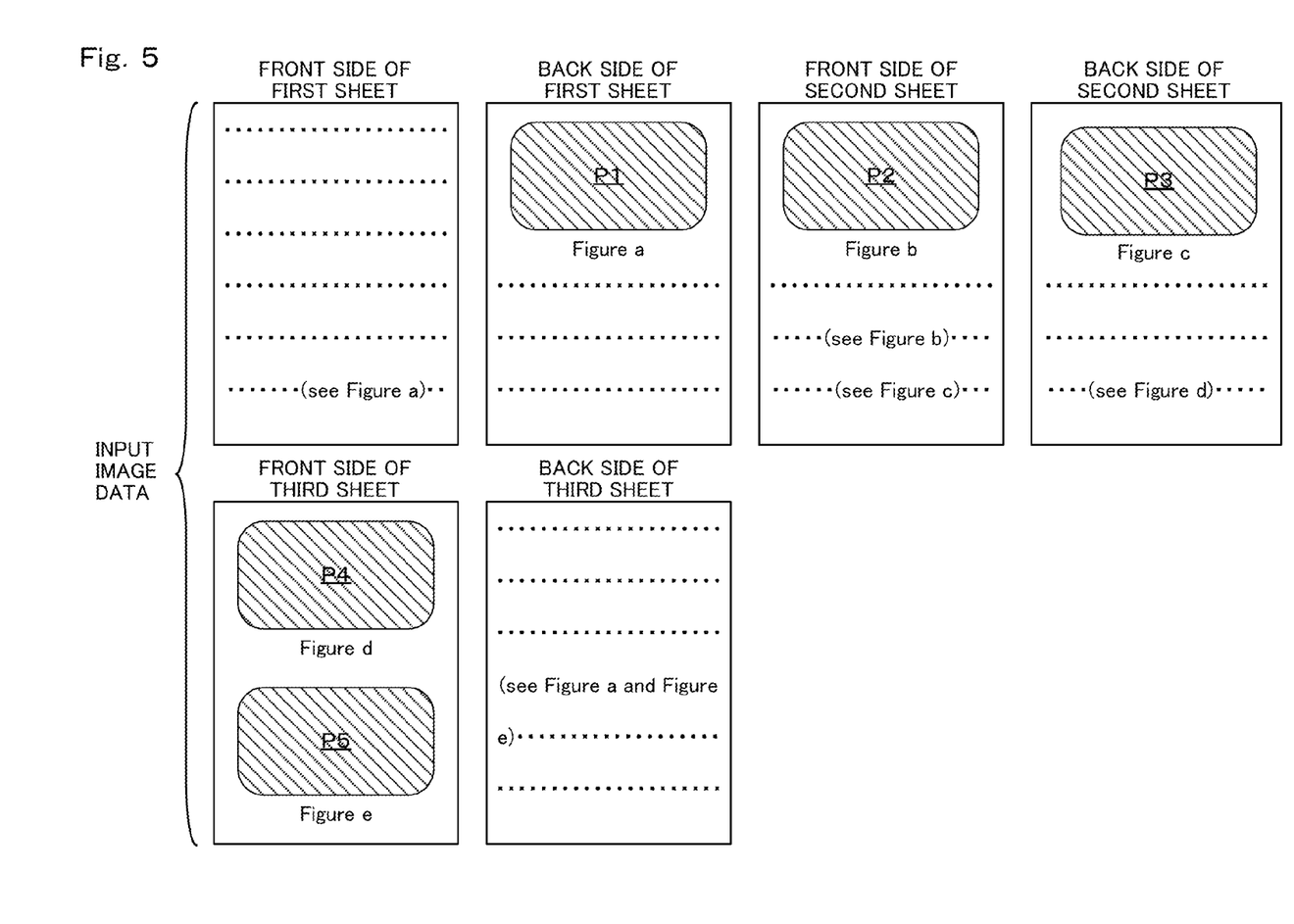
FIG. 5 is a diagram for explaining an example of input image data inputted to the multifunction peripheral according to the embodiment of the present disclosure.
Figure 6:
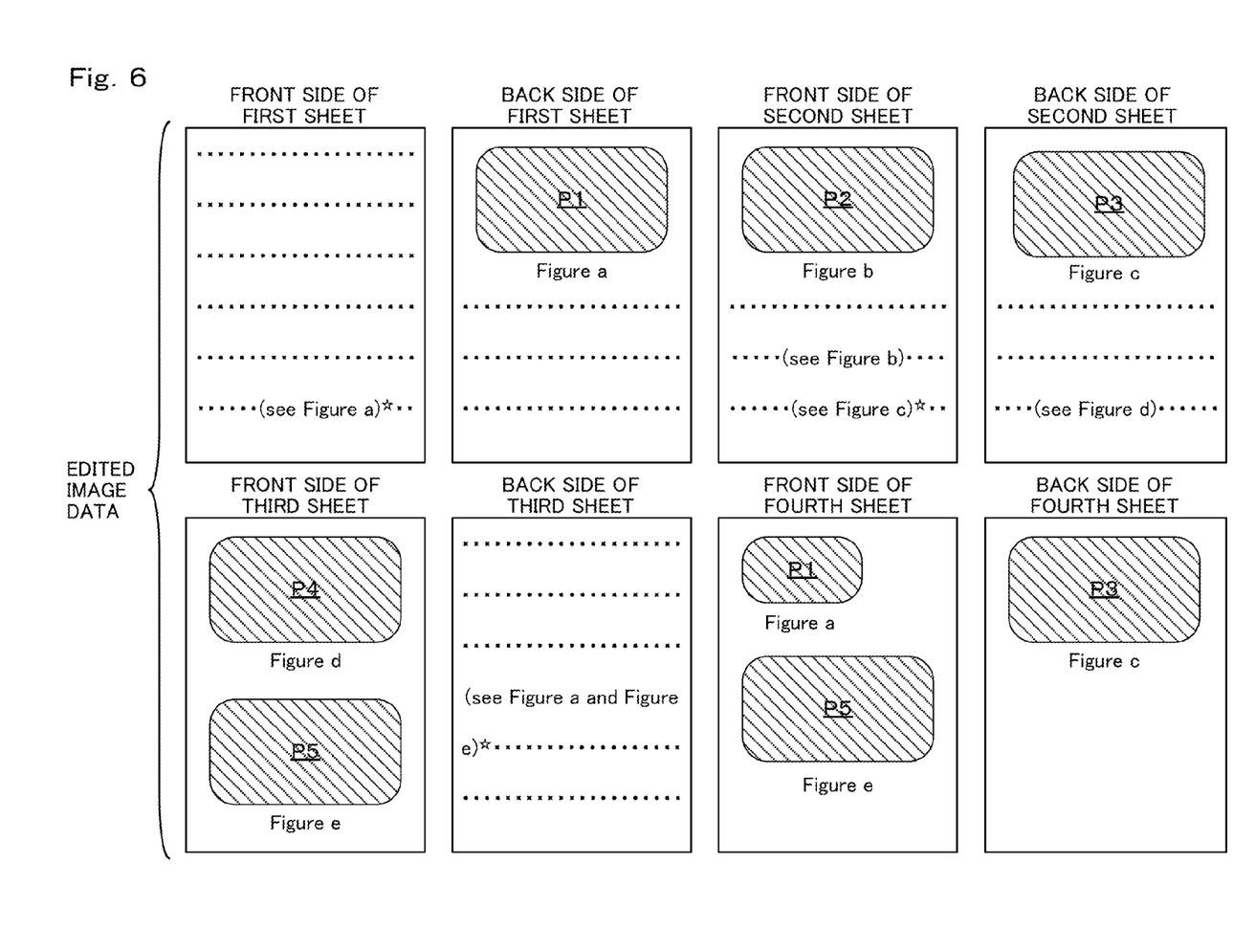
FIG. 6 is a diagram for explaining an example of a result of execution of the both-side print processing executed by the multifunction peripheral according to the embodiment of the present disclosure.

Here, FIGS. 3 and 5 are examples of the input image data, and FIGS. 4 and 6 are examples of the edited image data. The input image data shown in FIG. 3 and the input image data shown in FIG. 5 are different in that their reference characters written on the back sides of the third sheets are "see Figure e" and "see Figure a and Figure e", respectively.

First, in the case where the input image data shown in FIG. 3 is inputted, in the both-side print processing, the control portion 5 extracts objects P1 to P5, identification characters "Figure a" to "Figure e", and reference characters "see Figure a" to "see Figure e" (step S1).

Then, if it is assumed that the input image data is printed by both-side printing, the reference character "see Figure a" corresponding to the object P1 is printed on a side opposite to a side on which the object P1 is printed. In addition, similarly, the reference character "see Figure c" corresponding to the object P3 is printed on a side opposite to a side on which the object P3 is printed, and the reference character "see Figure e" corresponding to the object P5 is printed on a side opposite to a side on which the object P5 is printed. Therefore, the control portion 5 specifies the objects P1, P3, and P5 as specific objects (step S2).

Therefore, the control portion 5 generates edited image data in which the specific objects P1, P3, and P5 are copied onto additional pages which are to be printed on a paper sheet different from those for the reference characters "see Figure a", "see Figure c", and "see Figure e" corresponding to the specific objects P1, P3, and P5 (steps S4 to S8). Here, FIG. 4 is a diagram showing an example of the edited image data. As shown in FIG. 4, in the edited image data, additional pages of the front side and the back side of the fourth sheet, onto which the specific objects P1, P3, and P5 have been copied, are added at the end of the input image data. In addition, in the edited image data, asterisks as the copy target information are added to the reference characters "see Figure a", "see Figure c", and "see Figure e" corresponding to the specific objects P1, P3, and P5. Further, the copy of the object P1 on the additional page is the one that has been reduced at the predetermined reduction rate.

Therefore, as a result of the both-side printing of the edited image data shown in FIG. 4, when reading a part where the reference characters "see Figure a", "see Figure c", and "see Figure e" are written, a viewer of the document can refer to the specific objects P1, P3, and P5 printed on a different paper sheet. In addition, owing to the asterisks added as the copy target information, the viewer can easily recognize that the specific objects P1, P3, and P5 corresponding to the reference characters "see Figure a", "see Figure c", and "see Figure e" have been copied onto the additional pages.

On the other hand, in the case where the input image data shown in FIG. 5 is inputted, in the both-side print processing, the control portion 5 extracts objects P1 to P5, identification characters "Figure a" to "Figure e", and reference characters "see Figure a" to "see Figure a and Figure e" (step S1). Here, only a difference from the case where the input image data shown in FIG. 3 is inputted will be described.

Specifically, in the input image data shown in FIG. 5, the reference character "see Figure a and Figure e" indicating reference to the two specific objects P1 and P5 is written on the back side of the third sheet. Therefore, the control portion 5 changes the layout of the specific objects P1, P3, and P5 on the additional pages in the edited image data so that the specific objects P1 and P5 are printed on the same page (step S10). Here, FIG. 6 is a diagram showing an example of a result of the change of the layout of the edited image data. In the edited image data shown in FIG. 6, the objects P1 and P5 are placed on the front side of the fourth sheet and the object P3 is placed on the back side of the fourth sheet.

Therefore, as a result of the both-side printing of the edited image data shown in FIG. 6, when reading a part where the reference character "see Figure a and Figure e" is written, a viewer of the document can refer to the specific objects P1 and P5 at the same time, which are printed on the same page of a different paper sheet.

In the both-side print processing described in the above embodiment, the case of executing the image processing procedure (steps S1 to S10) for generating the edited image data and the both-side print step (step S11) based on the edited image data, has been described as an example.

Alternatively, the present disclosure may be understood as disclosure of an electronic apparatus that executes the image processing procedure including steps S1 to S10, or a computer-readable storage medium having stored therein an image processing program for causing a computer to execute each step of the image processing procedure. For example, the electronic apparatus is a personal computer, a portable terminal, a smartphone, a tablet terminal, a scanner apparatus, or a facsimile apparatus. By executing the image processing procedure (steps S1 to S10), the electronic apparatus can generate the edited image data that can reduce a burden when the both-side printed document is viewed.

In the above embodiment, the case where the control portion 5 executes the image processing procedure (steps S1 to S10) when image data including a plurality of pages is requested to be printed, has been described as an example. Alternatively, as another embodiment, it is also conceivable that the control portion 5 executes only the image processing procedure before image data is requested to be printed, thereby generating edited image data in advance based on the image data. That is, a timing of executing the image processing procedure is not limited to when a print request is given. For example, the image processing procedure may be executed when a user performs print setting for image data on the multifunction peripheral 10 or the electronic apparatus. Alternatively, it is also conceivable that in accordance with a predetermined operation input from a user, the multifunction peripheral 10 or the electronic apparatus executes the image processing procedure as image editing processing separated from print setting. It is noted that in such a case where edited image data is generated in advance as described above, the edited image data is stored into a storage portion such as a hard disc provided in the multifunction peripheral 10 or the electronic apparatus.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image processing method comprising:
analyzing image data and extracting one or more objects and a reference character from the image data;
extracting, based on a result of analyzing the image data, positions of the one or more objects and a position of the reference character indicating reference to each object, included in the image data;
predicting a result of both-side printing to be executed based on the image data and specifying whether or not a specific object exists among the one or more objects based on a result of the extracting, the specific object being an object for which the reference character corresponding to the object is to be printed on a side opposite to a side on which the object is to be printed when the image data is printed by the both-side printing; and
when the specific object is specified as existing, generating, based on the image data, edited image data in which the specific object is copied to a position that allows the specific object to be printed on a paper sheet different from that for the reference character corresponding to the specific object when the image data is printed by the both-side printing.

2. The image processing method according to claim 1, wherein extracting the position of the one or more objects comprises extracting a position of an identification character attached to a vicinity or inside of each of the one or more objects.

3. The image processing method according to claim 1, wherein generating the edited image data comprises adding, as a last page of the image data, an additional page onto which the specific object has been copied.

4. The image processing method according to claim 1, wherein generating edited image data comprises, when a reference character indicating reference to a plurality of the specific objects is present, placing the plurality of specific objects corresponding to the reference character on a same page in the edited image data.

5. The image processing method according to claim 1, wherein generating the edited image data comprises adding, to the specific object or the reference character corresponding to the specific object, a predetermined symbol or page information as copy target information indicating that the specific object has been copied.

6. An electronic apparatus comprising:
an extraction portion that analyzes image data and extracts one or more objects and a reference character from the image data, and based on a result of analyzing the image data, extracts positions of one or more objects and a position of the reference character indicating reference to each object included in the image data;
a specifying portion that predicts a result of both-side printing to be executed based on the image data and specifies whether or not a specific object exists among the one or more objects based on a result of the extracting by the extraction portion, the specific object being an object for which the reference character corresponding to the object is to be printed on a side opposite to a side on which the object is to be printed when the image data is printed by the both-side printing; and
a data generating portion that, when the specific object is specified as existing, generates, based on the image data, edited image data in which the specific object is copied to a position that allows the specific object to be printed on a paper sheet different from that for the reference character corresponding to the specific object when the image data is printed by the both-side printing.

7. The electronic apparatus according to claim 6, wherein the extraction portion extracts, as the position of each of the one or more objects, a position of an identification character attached to a vicinity or inside of each of the one or more objects.

8. The electronic apparatus according to claim 6, wherein the data generating portion generates the edited image data by adding, as a last page of the image data, an additional page onto which the specific object has been copied.

9. The electronic apparatus according to claim 6, wherein the data generating portion, when a reference character indicating reference to a plurality of the specific objects is present, places the plurality of specific objects corresponding to the reference character on the same page in the edited image data.

10. The electronic apparatus according to claim 6, wherein the data generating portion adds, to the specific object or the reference character corresponding to the specific object, a predetermined symbol or page information as copy target information indicating that the specific object has been copied.

11. An image forming apparatus comprising:
an extraction portion that analyzes image data and extracts one or more objects and a reference character from the image data, and based on a result of analyzing the image data, extracts positions of one more objects and a position of the reference character indicating reference to each object, included in the image data;
a specifying portion that predicts a result of both-side printing to be executed based on the image data and specifies whether or not a specific object exists among the one or more objects based on a result of the extracting by the extraction portion, the specific object being an object for which the reference character corresponding to the object is to be printed on a side opposite to a side on which the object is to be printed when the image data is printed by the both-side printing;
a data generating portion that, when the specific object is specified as existing, generates, based on the image data, edited image data in which the specific object is copied to a position that allows the specific object to be printed on a paper sheet different from that for the reference character corresponding to the specific object when the image data is printed by both-side printing; and
a both-side print processing portion that forms an image on both sides of a print sheet based on the edited image data generated by the data generating portion.

12. The image forming apparatus according to claim 11, wherein the extraction portion extracts, as the position of each of the one or more objects, a position of an identification character attached to a vicinity or inside of each of the one or more objects.

13. The image forming apparatus according to claim 11, wherein the data generating portion generates the edited image data by adding, as a last page of the image data, an additional page onto which the specific object has been copied.

14. The image forming apparatus according to claim 11, wherein the data generating portion, when a reference character indicating reference to a plurality of the specific objects is present, places the plurality of specific objects corresponding to the reference character on the same page in the edited image data.

15. The image forming apparatus according to claim 11, wherein the data generating portion adds, to the specific object or the reference character corresponding to the specific object, a predetermined symbol or page information as copy target information indicating that the specific object has been copied.

\* \* \* \* \*